US011017417B1

(12) United States Patent
Pohlack

(10) Patent No.: US 11,017,417 B1
(45) Date of Patent: May 25, 2021

(54) USING INCENTIVES TO MANAGE COMPUTING RESOURCES

(71) Applicant: Amazon Technologies, Inc., Reno, NV (US)

(72) Inventor: Martin Thomas Pohlack, Dresden (DE)

(73) Assignee: Amazon Technologies, Inc., Reno, NV (US)

(*) Notice: Subject to any disclaimer, the term of this patent is extended or adjusted under 35 U.S.C. 154(b) by 1922 days.

(21) Appl. No.: 14/314,990

(22) Filed: Jun. 25, 2014

(51) Int. Cl.
*G06Q 40/00* (2012.01)
*G06Q 30/02* (2012.01)
*G06N 5/02* (2006.01)

(52) U.S. Cl.
CPC ......... *G06Q 30/0206* (2013.01); *G06N 5/025* (2013.01); *G06Q 30/0283* (2013.01)

(58) Field of Classification Search
CPC ............ G06Q 10/06311; G06Q 30/04; G06Q 30/0204; G06Q 30/0283; Y04S 20/224; G05B 2219/24001; G05B 2219/24113; G06F 9/4881; H05K 7/2079; H05K 7/20827; C23C 18/16
USPC ......... 705/7.15, 317, 400, 34, 30, 412, 700; 717/120; 1/1
See application file for complete search history.

(56) References Cited

U.S. PATENT DOCUMENTS

| | | | | |
|---|---|---|---|---|
| 8,918,730 B2* | 12/2014 | von Kaenel | ............ | G06Q 40/08 715/764 |
| 9,229,773 B1* | 1/2016 | Snow | ........................ | G06F 9/485 |
| 9,336,030 B1* | 5/2016 | Marr | ..................... | G06F 9/5077 |
| 10,623,285 B1* | 4/2020 | Shevade | ............. | H04L 43/0817 |
| 2013/0254081 A1* | 9/2013 | Kurabayashi | .......... | G06Q 30/04 705/34 |
| 2014/0040343 A1* | 2/2014 | Nickolov | ............ | H04L 67/1029 709/201 |
| 2014/0108775 A1* | 4/2014 | Kludy | ................. | G06F 9/45558 713/2 |

FOREIGN PATENT DOCUMENTS

WO    WO-2013036699 A2 *  3/2013  ............. G06F 9/485

OTHER PUBLICATIONS

Moskowitz, Jeremy; "PC Power Management: Group Policy Controls and Beyond" Oct. 30, 2009: Whitepaper. Faronics, 9 pages.*
Francois, Pierre; Coste, Pierre-Alain; Decraene, Bruno and Bonaventure, Olivier; "Avoiding Disruptions During Maintenance Operations in BGP Sessions"2007, IEEE Transactions on Network and Service Management, 4(3):1-11.*

(Continued)

*Primary Examiner* — Shannon S Campbell
*Assistant Examiner* — Freda A Nelson
(74) *Attorney, Agent, or Firm* — BakerHostetler

(57) ABSTRACT

Systems and methods are described for managing computing resources by a provider network. A selection of a pricing plan for use of a computing resource is received. The pricing plan can include inclusion of a premium for continued use of the computing resource during a maintenance window, or a cost benefit for interrupting use of the computing resource during the maintenance window. Maintenance is performed on the computing device in accordance with the maintenance window and based on the selected pricing plan.

19 Claims, 7 Drawing Sheets

(56) References Cited

OTHER PUBLICATIONS

Francois, Pierre; Coste, Pierre-Alain; Decraene, Bruno and Bonaventure, Olivier; "Avoiding Disruptions During Maintenance Operations in BGP Sessions"2007, IEEE Transactions on Network and Service Management, 4(3):1-11 (Year: 2007).*

Samdizzy, "Microsoft and Google: Is 99.9% Cloud Uptime Good Enough for Partners", Jan. 20, 2011, channelfutures.com, 4 pages (Year: 2011).*

Pallmann, David: "Glass Half Empty: Understanding Cloud Computing SLAs"; Feb. 23, 2013; davidpallmann.blogspot.com; 4 pgs. (Year: 2013).*

* cited by examiner

USING INCENTIVES TO MANAGE COMPUTING RESOURCES

BACKGROUND

A data center is a facility that houses computer systems and various networking, storage and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
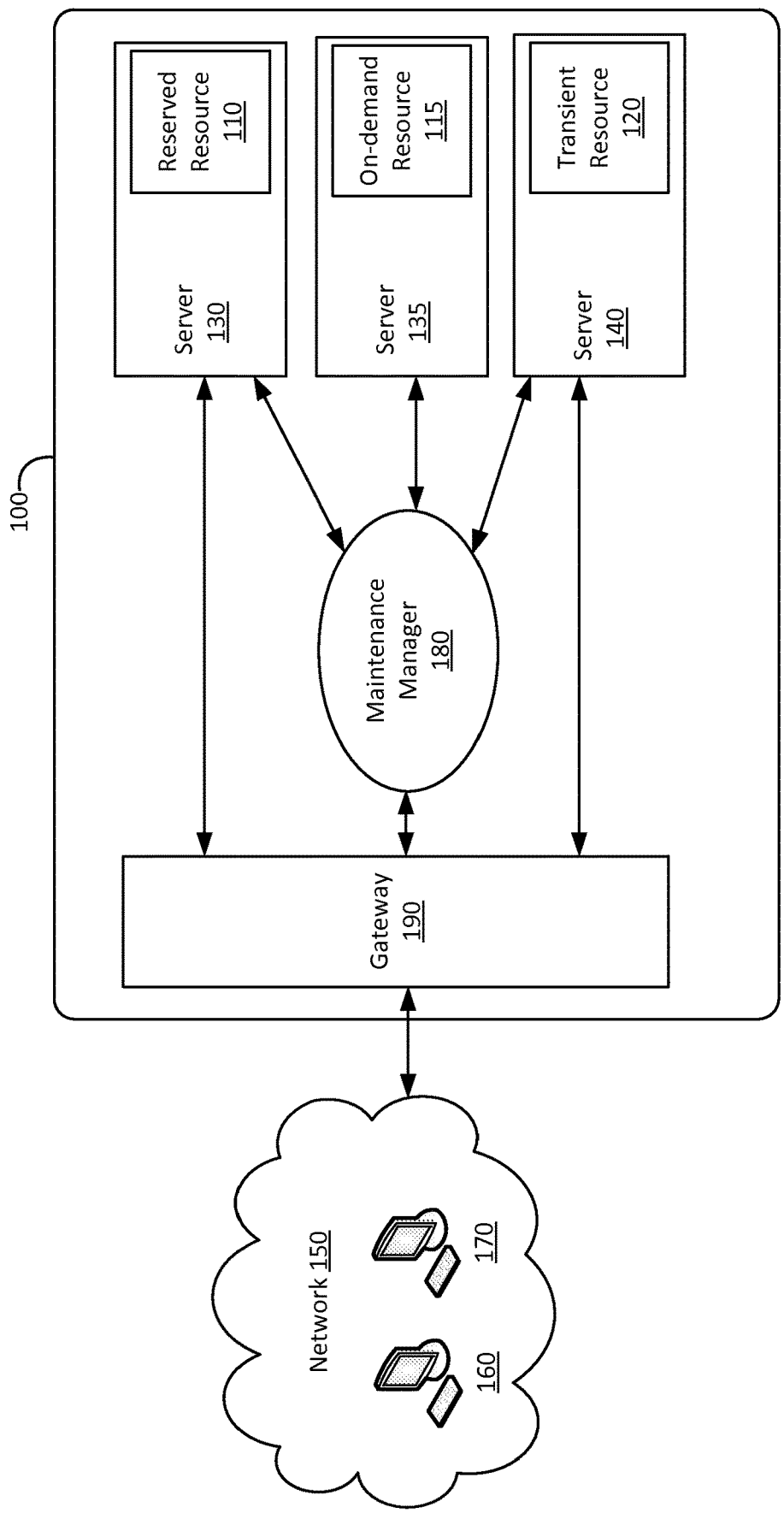
FIG. 1 is a diagram illustrating a mechanism for providing transition notifications in accordance with the present disclosure.

The following detailed description is directed to technologies for managing computing resources in a computing environment and managing maintenance actions for the computing resources. In the examples described herein, a data center is one example of a computing environment in which the described embodiments can be implemented. However, the described concepts can apply generally to other computing environments, for example across multiple data centers or locations.

In computing environments such as a data center, servers hosting computing instances and other resources host are maintained on a regular basis. Some maintenance work may be more difficult or, in some cases, not possible when the computing resources running on a given server are not shut down or migrated to another server. For example, events such as rebooting of the server, installing updates to the hypervisor, installing updates to the controlling virtual machine (e.g., Dom0), or performing a complete rebuild of the host's file system may require that the computing resource be shut down or migrated. In some cases, migration of resources may not be possible in large scales because of extensive local states (local file systems, etc.). In environments with a large fleet of servers, software version proliferation may result and the ability to perform maintenance updates may become increasingly important for provider networks.

In some embodiments, incentives may be used to motivate customers to enhance the provider network's ability to implement its maintenance objectives. Provider networks typically establish maintenance windows that are scheduled on a regular basis (e.g., monthly) or on an on-demand basis with notifications provided to customers (e.g., a week in advance). During the maintenance window, customers are expected to terminate or shut down their computing resources. The maintenance window may be staggered over a large time frame for different computing resources such that at any given time only a small fraction of the provider network's servers are scheduled to be maintained. In this way, the maintenance load is distributed across the provider network's resources and customers.

If the maintenance windows of computing resources on a given server are coordinated, the provider network can control and update the server during a scheduled time frame if customers abide by the scheduled maintenance window. Even if less than all of the customers participate in the scheduled maintenance windows, the provider network will be able to maintain a significant portion of the fleet. Furthermore, the non-participating customers' computing resources may be handled via live migration with significantly less effort because fewer computing resources would have to be migrated.

In one embodiment, incentives may be implemented as part of the customers' billing rates. For example, higher hourly prices may be set for customers who choose to run computing resources during a maintenance window. By setting a higher price during maintenance windows, customers may make a tradeoff based on the customer's ability and willingness to participate in the maintenance window. Thus a customer may select the option to not pay the higher price and observe the maintenance window, or continue running their computing resource during the maintenance window and pay the higher price. The provider network may benefit by potentially increasing the participation in maintenance window schedules and thus increasing the efficiency of maintenance windows across the fleet, while distributing the maintenance cost to non-participating customers.

In some embodiments, normal operating prices may be lowered for customers who participate in maintenance window schedules, in addition to raising prices for customers who do not participate in maintenance windows such that the expected average price is constant over longer time frames and average customer prices do not have to be adjusted. The individual price adjustments thus result in a redistribution of prices such that customers who opt to run their computing resources during maintenance windows pay a higher proportion of the cost associated with maintenance of servers while running customer resources.

In one embodiment, negative hourly prices can be offered for participation in maintenance windows to further motivate customers to participate. Furthermore, maintenance hourly prices can be adjusted based on the relative importance of the maintenance windows. For example, for very important short-term updates or for long-term maintenance of servers (e.g., on a yearly basis), prices may be adjusted higher as compared to maintenance cycles that are considered less important to the provider network. The cost may be adjusted to influence the probability of customer cooperation for a given maintenance window event. Actual data for customer participation may be used to further refine the price adjustments. For example, a relationship between price adjustments and a predicted level of customer participation in a maintenance window event may be observed, thus allowing for increasingly accurate predictions for customer participation based on the incentives.

The probability that all customers on a given server will vacate the server during a given maintenance window may also depend on the number of active computing resources on the server. The incentive may thus be higher for dense servers and lower for servers with a single or a smaller number of customers.

In an embodiment, the provider network may allow a customer to select a default response to notification of a scheduled maintenance window in the absence of the customer's response. For example, some default responses may include:

- Always ignore the maintenance window and continue computing at the higher price for running the resource during the window.
- Continue using the computing resource until a specified extra-maintenance budget has been reached (e.g., the customer may set a maximum cumulative budget for continuing to run a resource during a maintenance window).
- Continue using the computing resource until a specified price threshold for maintenance has been reached (e.g., a maximum price that the customer is willing to pay to run the resource during a given window).
- Always shut down computing resources during a scheduled maintenance window and resume after its conclusion.

FIG. 1 is a diagram illustrating a system 100 including a framework for incentives for managing resources in accordance with the present disclosure. In FIG. 1, system 100 may include a reserved resource 110, an on-demand resource 115, and a transient resource 120 that may be implemented, for example, on server computers 130, 135, and server 140, respectively. It will be appreciated that some embodiments may involve additional resources of various types that may be instantiated on additional server computers or storage devices.

FIG. 1 also illustrates a public network 150 that may include one or more computers, such as computers 160 and 170. According to one embodiment, reserved resource 110, on-demand resource 115, and transient resource 120 may be configured to provide computing services to a computer user (not shown) of public network 150 via gateway 190 and computers 160 and 170. For example, a customer may import one or more virtual instance images to reserved resource 110, on-demand resource 115, and transient resource 120.

A maintenance manager 180 may send notifications to a user at computer 160 or 170 regarding scheduled maintenance pertaining to the customer's resources and manage pricing for the customer's resources based on participation in the scheduled maintenance. In some embodiments, a notification may be received directly from the user at computer 160 or 170. The notification may be also received by other services running on system 100. In response to the scheduling of a maintenance window, maintenance manager 180 may log the scheduled window. The maintenance manager 180 may communicate with other services to facilitate: (1) processing of the scheduled window, (2) accessing data pertaining to scheduled window, and (3) generating interfaces to provide results for the scheduled window. The maintenance manager 180 may provide an interface for responding to notifications. The maintenance service 180 may further provide an interface for viewing information pertaining to maintenance windows and taking further actions in response to user inputs. The maintenance service 180 may be made accessible via an API or a user interface that may be accessed via a web browser or other input mechanisms.

In a data center environment, it is desirable to maximize customer participation in scheduled maintenance and maximize resource maintenance to increase efficiency in managing the resources in the data center. When new hardware configurations are added, for example, fleet fragmentation can result, and the overall ability of the computing environment to meet performance goals and manage capacity can be compromised. By thoroughly maintaining computing configurations, it is possible to achieve greater integration of the computing configuration into the computing environment's products and services.

In some embodiments, maintenance manager 180 may be configured to interact with other computing environment services such as a fleet management service, a capacity pool management service, and a configuration management service to provide the above described capabilities. The configuration management system may be configured to manage configurations and map configurations to computing devices in the computing environment. By interacting with a fleet management infrastructure that may include a configuration management system and other fleet management subsystems, maintenance manager 180 can determine costs associated with loss of revenue when resources are pulled from production for maintenance. The cost of removing a particular resource from production can be determined based on current market conditions for the services provided by the resource. This cost can be used to determine incentives and premiums that may be applied to customers for participating in maintenance windows.

Figure 2:
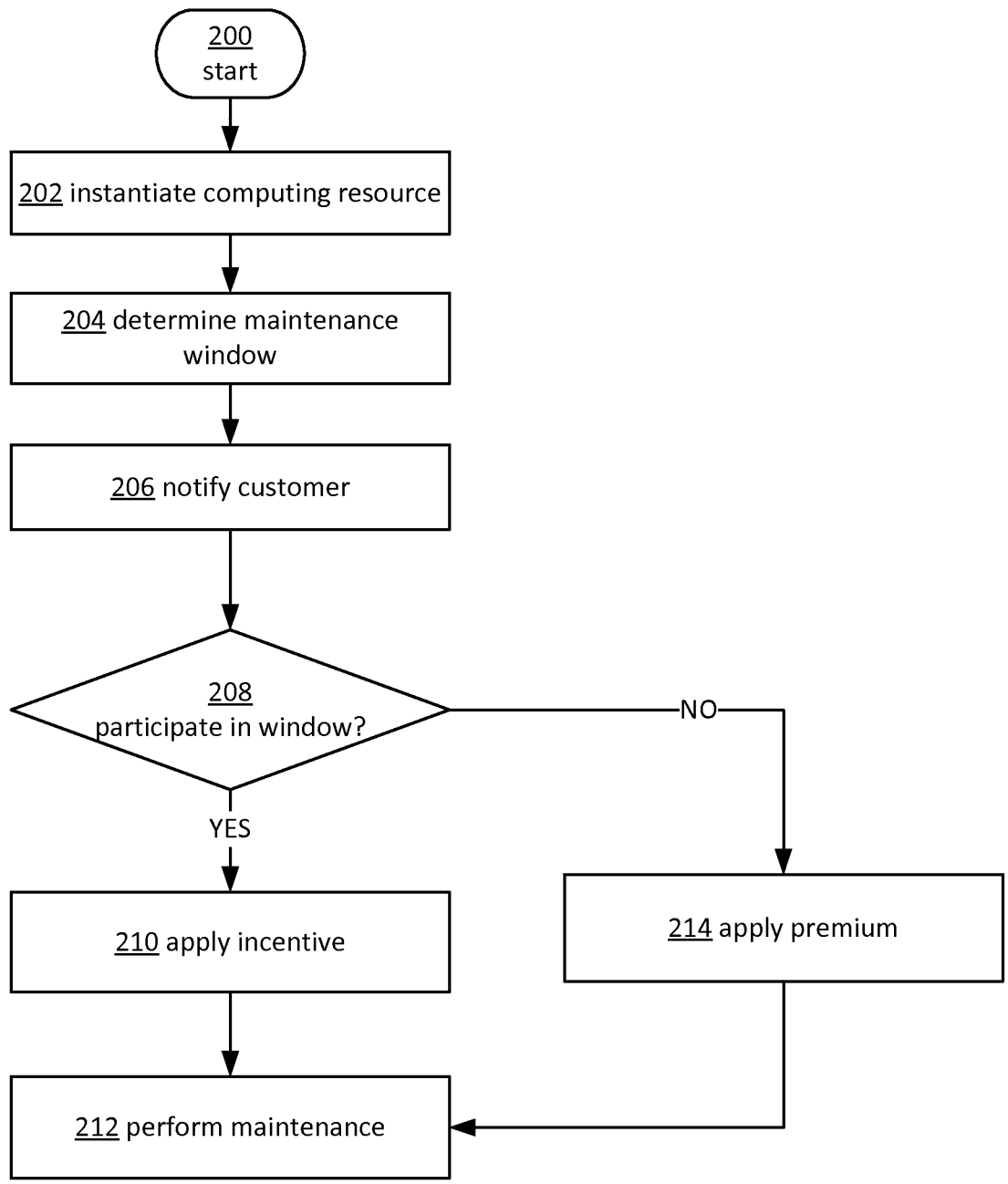
FIG. 2 is a diagram illustrating an example computing system that may be used in some embodiments.

FIG. 2 illustrates an example operational procedure for providing maintenance incentives in a computing environment. In an embodiment, the operational procedure can be implemented by maintenance manager 180 in FIG. 1. The operational procedure may be implemented in a system including one or more computing devices. The system may also include a memory having stored therein computer instructions that, upon execution by the system, perform one or more steps of the operational procedure.

Referring to FIG. 2, operation 200 begins the operational procedure. Operation 200 may be followed by operation 202. Operation 202 illustrates instantiating a computing resource on one of the one or more computing devices. In an embodiment, the computing resource may be associated with a user. Operation 202 may be followed by operation 204. Operation 204 illustrates determining a maintenance window for the one computing device.

In some embodiments, operation 204 may be followed by operation 206. Operation 206 illustrates notifying the customer of the scheduled maintenance window. Operation 206 may be followed by operation 208. Operation 208 illustrates determining that the user has indicated payment of a price for use of the computing resource during the maintenance window. If the user has not indicated payment of a price for use of the computing resource during the maintenance window, then operation 208 may be followed by operation 210. Operation 210 illustrates that the price includes applying a cost benefit for shutting down or migrating the computing resource during the maintenance window. If the user has indicated payment of a price for use of the computing resource during the maintenance window, then operation 208 may be followed by operation 214. Operation 210 may be followed by operation 212. Operation 212 illustrates allowing scheduled maintenance to proceed for the one computing device in accordance with the maintenance window and based on the indicated payment.

In some embodiments, the premium comprises an incremental price increase for continued use of the computing resource during the maintenance window. In one embodiment, the cost benefit comprises an incremental price decrease for continued use of the computing resource during the maintenance window. The price may be adjusted so that price adjustments are incorporated into a base price for the computing resource. Alternatively, the price may be adjusted so that price adjustments are incorporated as charges or credits to the user in addition to a base price for the computing resource.

In some embodiments, customer participation in the maintenance window may include interrupting use of the customer's resource. This may include shutting down the computing resource, or migrating the computing resource to another computing device.

In some embodiments, prices may be further adjusted based on a weight associated with the maintenance window. The weight may indicate a relative importance of the maintenance window. The prices may be further adjusted based on previous customer participation in previous maintenance windows. Historical participation data may be used to refine incentives to maximize participation in maintenance windows. The prices may be further adjusted based on a relative density of resources on the computing device.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools; such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 3:
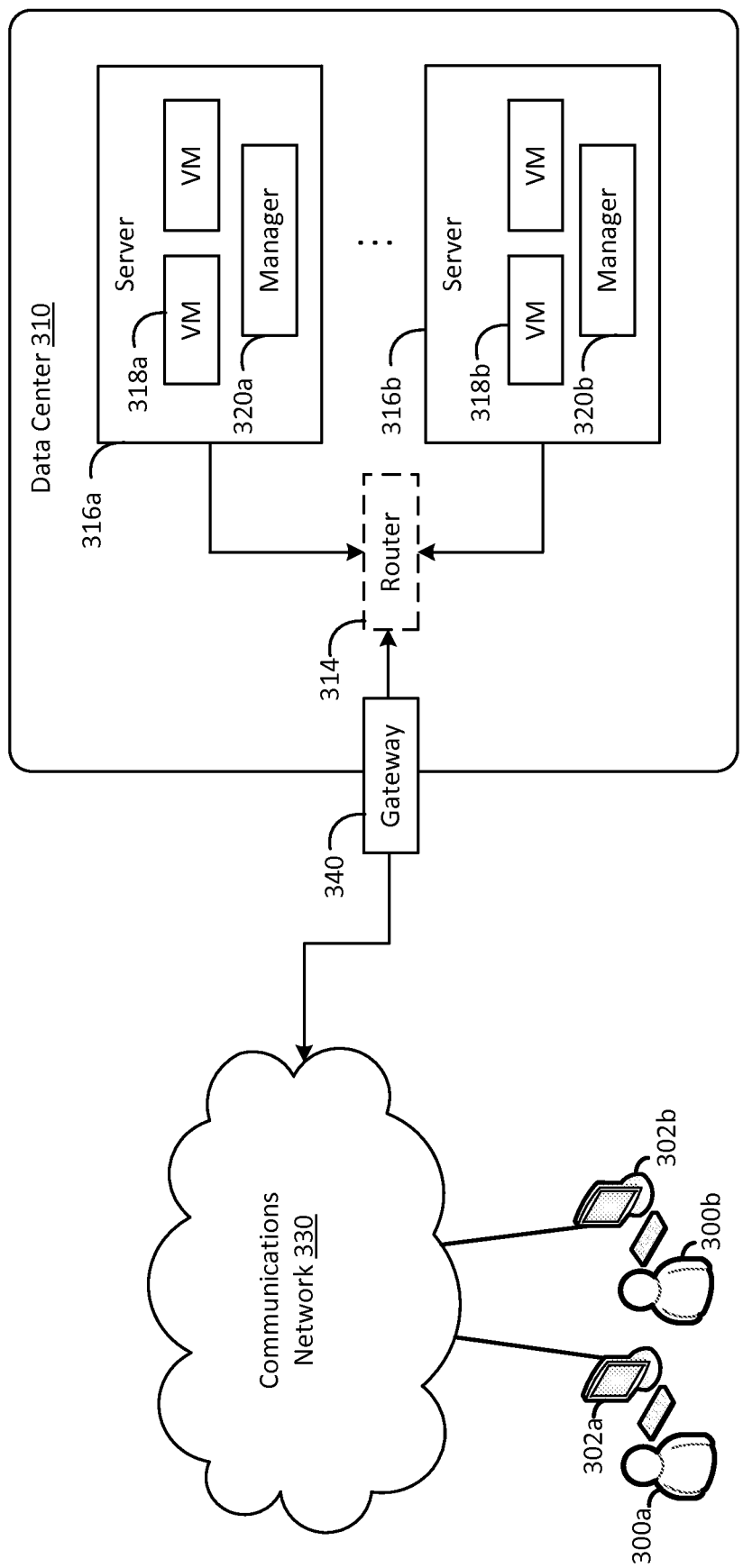
FIG. 3 is a diagram illustrating an example computing system that may be used in some embodiments.

FIG. 3 illustrates an example computing environment in which the embodiments described herein may be implemented. FIG. 3 is a diagram schematically illustrating an example of a data center 310 that can provide computing resources to users 300a and 300b (which may be referred herein singularly as "a user 300" or in the plural as "the users 300") via user computers 302a and 302b (which may be referred herein singularly as "a computer 302" or in the plural as "the computers 302") via a communications network 330. Data center 310 may be configured to provide computing resources for executing applications on a permanent or an as-needed basis. The computing resources provided by data center 310 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 310 may include servers 316a and 316b (which may be referred herein singularly as "a server 316" or in the plural as "the servers 316") that provide computing resources available as virtual machine instances 318a and 318b (which may be referred herein singularly as "a virtual machine instance 318" or in the plural as "the virtual machine instances 318"). The virtual machine instances 318 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 3, communications network 330 may, for example, be a publicly accessible network of linked networks and possibly operated by various distinct parties, such as the Internet. In other embodiments, communications network 330 may be a private network, such as, for example, a corporate or university network that is wholly or partially inaccessible to non-privileged users. In still other embodiments, communications network 330 may include one or more private networks with access to and/or from the Internet.

Communications network 330 may provide access to computers 302. Computers 302 may be computers utilized by customers 300 or other customers of data center 310. For instance, user computer 302a or 302b may be a server, a desktop or laptop personal computer, a tablet computer, a wireless telephone, a personal digital assistant (PDA), an e-book reader, a game console, a set-top box, or any other computing device capable of accessing data center 310. User computer 302a or 302b may connect directly to the Internet (e.g., via a cable modem or a Digital Subscriber Line (DSL)). Although only two user computers 302a and 302b are depicted, it should be appreciated that there may be multiple user computers.

Computers 302 may also be utilized to configure aspects of the computing resources provided by data center 310. In this regard, data center 310 might provide a Web interface through which aspects of its operation may be configured through the use of a Web browser application program executing on user computer 302. Alternatively, a stand-alone application program executing on user computer 302 might access an application programming interface (API) exposed by data center 310 for performing the configuration operations. Other mechanisms for configuring the operation of the data center 310, including deploying updates to an application, might also be utilized.

Servers 316a and 316b (which may be referred herein singularly as "a server 316" or in the plural as "the servers 316") shown in FIG. 3 may be standard servers configured appropriately for providing the computing resources described above and may provide computing resources for executing one or more applications. In one embodiment, the computing resources may be virtual machine instances 318. In the example of virtual machine instances, each of the servers 316 may be configured to execute an instance manager 320a or 320b (which may be referred herein singularly as "an instance manager 320" or in the plural as "the instance managers 320") capable of executing the virtual machine instances. The instance managers 320 may be a virtual machine monitor (VMM) or another type of program configured to enable the execution of virtual machine instances 318 on servers 316, for example. As discussed above, each of the virtual machine instances 318 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 310 shown in FIG. 3, a router 314 may be utilized to interconnect the servers 316a and 316b. Router 314 may also be connected to gateway 240, which is connected to communications network 330. Router 314 may manage communications within networks in data center 310, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 310 described in FIG. 3 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality; including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments, the functionality of some of the illustrated modules may not be provided and/or other additional functionality may be available.

The capacity of purchased computing resources provided by data center 310 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 310 can be scaled on-demand.

Auto scaling is one mechanism for scaling computing resources in response to increases or lulls in demand for the resources. Auto scaling allows customers of data center 310 to configure data center 310 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 310.

Data center 310 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 4:
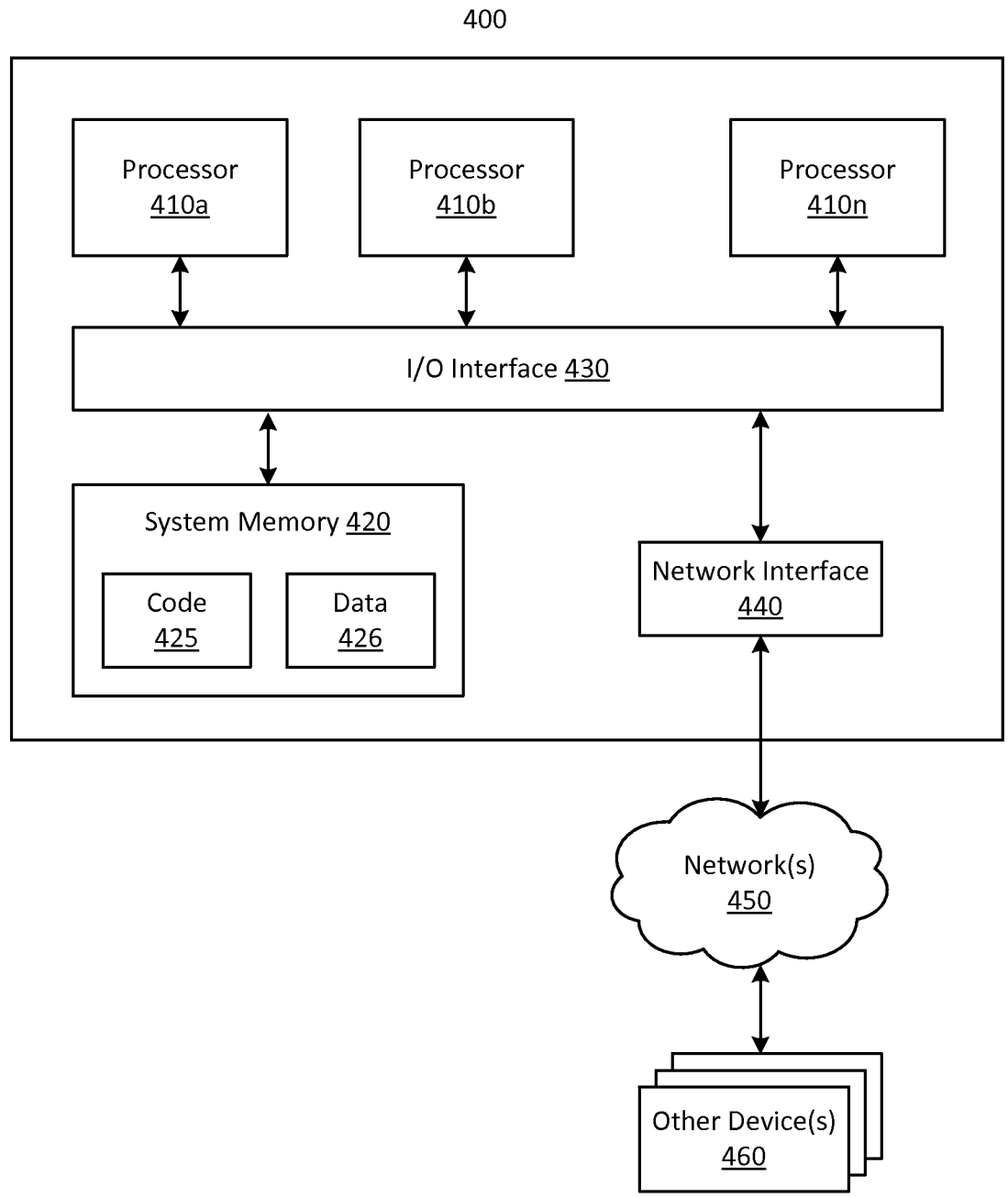
FIG. 4 is a diagram illustrating an example computing system that may be used in some embodiments.

In at least some embodiments, a server that implements a portion or all of one or more of the technologies described herein, including the techniques to implement the functionality of a maintenance service 180, may include a general purpose computer system that includes or is configured to access one or more computer-accessible media. FIG. 4 illustrates such a general purpose computing device 400. In the illustrated embodiment, computing device 400 includes one or more processors 410*a*, 410*b*, and/or 410*n* (which may be referred herein singularly as "a processor 410" or in the plural as "the processors 410") coupled to a system memory 420 via an input/output (I/O) interface 440. Computing device 400 further includes a network interface 440 coupled to I/O interface 430.

In various embodiments, computing device 400 may be a uniprocessor system including one processor 410 or a multiprocessor system including several processors 410 (e.g., two, four, eight, or another suitable number). Processors 410 may be any suitable processors capable of executing instructions. For example, in various embodiments, processors 410 may be general purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be configured to store instructions and data accessible by processor(s) 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 420 as code 425 and data 426.

In one embodiment, I/O interface 430 may be configured to coordinate I/O traffic between processor 410, system memory 420, and any peripheral devices in the device, including network interface 440 or other peripheral interfaces. In some embodiments, I/O interface 430 may perform any necessary protocol, timing, or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computing device 400 and other device or devices 460 attached to a network or network(s) 450, such as other computer systems or devices as illustrated in FIGS. 1 through 4, for example. In various embodiments, network interface 440 may support communication via any suitable wired or wireless general data networks, such as types of Ethernet networks, for example. Additionally, network interface 440 may support communication via telecommunications/telephony networks, such as analog voice networks or digital fiber communications networks, via storage area networks, such as Fibre Channel SANs or via any other suitable type of network and/or protocol.

In some embodiments, system memory 420 may be one embodiment of a computer-accessible medium configured to store program instructions and data as described above for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 400 via I/O interface 430. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 400 as system memory 420 or another type of memory. Further, a computer-accessible medium may include transmission media or signals such as electrical, electromagnetic or digital signals, conveyed via a communication medium such as a network and/or a wireless link, such as may be implemented via network interface 440. Portions or all of multiple computing devices, such as those illustrated in FIG. 4, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications, and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container), in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region; and network transmissions between resources of the same availability zone may be even faster.

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages), that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 5:
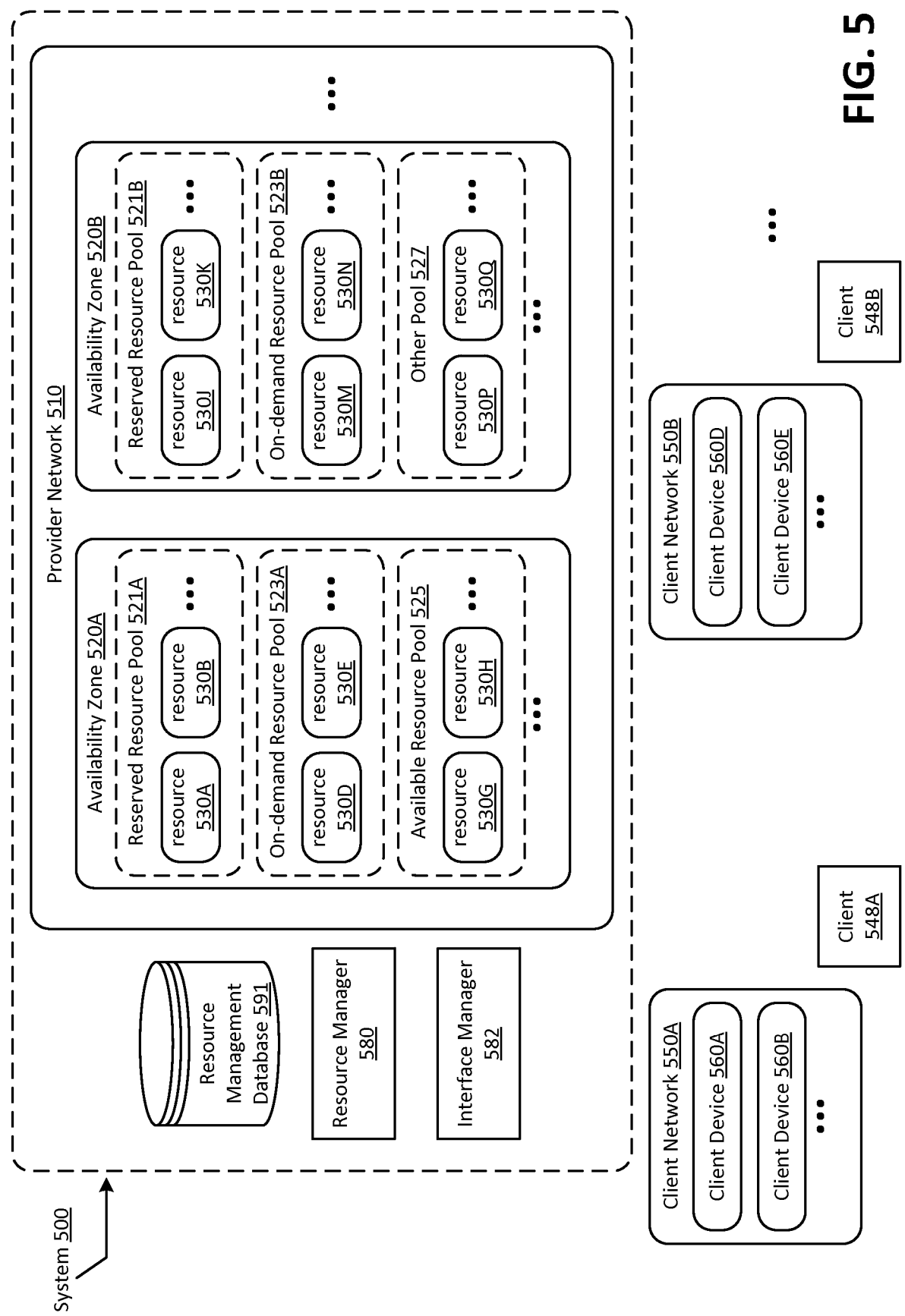
FIG. 5 is a diagram illustrating an example computing system that may be used in some embodiments.

FIG. 5 illustrates an example system environment for providing instances, according to at least some embodiments. The system 500 may include a provider network 510 comprising a plurality of resource instances 530 (which may be referred herein singularly as "a resource instance 530" or in the plural as "the resource instances 530"), such as instances 530A, 530B, 530D, 530E, 530G, and 530H in one availability zone 520A and instances 530J, 530K, 530M, 530N, 530P, and 530Q in a different availability zone 520B. The various resource instances 530 in the availability zones 520A and 520B (which may be referred herein singularly as "an availability zone 520" or in the plural as "the availability zones 520") may be reserved and/or allocated for use by clients (or potential clients), such as client 548A and 548B (which may be referred herein singularly as "a client 548" or in the plural as "the clients 548"). In the illustrated embodiment, system 500 includes a resource manager 550 and an interface manager 552. As noted earlier, in some embodiments the functionality of the interface manager 582 may be implemented by a subcomponent of the resource manager 580.

The interface manager 552 may in some embodiments implement one or more programmatic interfaces allowing clients 548 to search for, browse, reserve, and acquire instances 530 to obtain various types of services, e.g., to run and/or access various applications. In the illustrated embodiment, at a given point in time, some or all of the instances 530 may be assigned to instance pools, such as reserved instance pools 521A or 521B, on-demand instance pools 523A or 523B, available instance pool 525, or other pools, such as other pool 527.

In some embodiments, a given pool, such as available instance pool 525, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 530 illustrated in FIG. 5 are shown as belonging to availability zones 520, in other embodiments the provider network 510 may be organized differently, e.g., in some embodiments availability zones 520 may not be implemented. Availability zones 520 may be grouped into geographic regions (not shown in FIG. 5) in some embodiments. Instance pools may be implemented within availability zones in some implementations (e.g., each availability zone may have its own reserved instance pool); while in other implementations an instance pool or sub-pool may span multiple availability zones.

Figure 6:
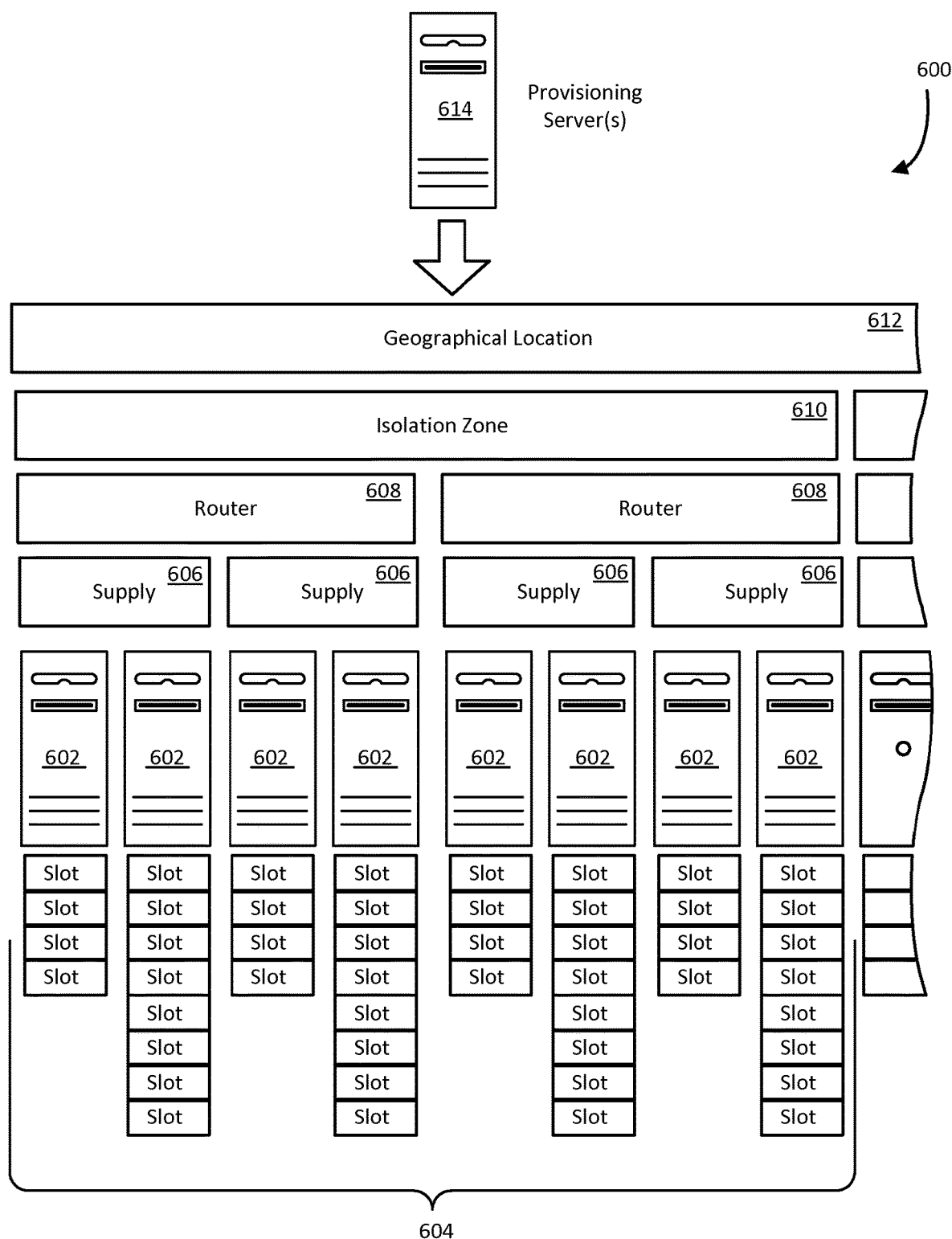
FIG. 6 is a diagram illustrating systems for providing transition notifications in accordance with the present disclosure.

In some embodiments, such as in FIG. 6, a data center 600 may be viewed as a collection of shared computing resources and/or shared infrastructure. For example, as shown in FIG. 6, a data center 600 may include virtual machine slots 604, physical hosts 602, power supplies 606, routers 608, isolation zone 610, and geographical location 612. A virtual machine slot 604 may be referred to as a slot or as a resource slot. A physical host 602 may be shared by multiple virtual machine slots 604, each slot 604 being capable of hosting a virtual machine, such as a guest domain. Multiple physical hosts 602 may share a power supply 606, such as a power supply 606 provided on a server rack. A router 608 may service multiple physical hosts 602 across several power supplies 606 to route network traffic. An isolation zone 610 may service many routers 608, the isolation zone 610 being a group of computing resources that may be serviced by redundant resources, such as a backup generator. Isolation zone 610 may reside at a geographical location 612, such as a data center 600. A provisioning server 614 may include a memory and processor configured with instructions to analyze user data and rank available implementation resources using determined roles and shared resources/infrastructure in the calculation. The provisioning server 614 may also manage workflows for provisioning and de-provisioning computing resources as well as detecting health and/or failure of computing resources.

A provisioning server 614 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 602 that shares a router 608 with a second system may be more proximate to the second system than to a third system only sharing an isolation zone 610. Depending on an application, it may be desirable to keep the distance low to increase throughput or high to increase durability. In another embodiment, the distance may be defined in terms of unshared resources. For example, two slots 604 sharing a router 608 may have a distance of a physical host 602 and a power supply 606. Each difference in resources may be weighted differently in a distance calculation.

A placement calculation may also be used when selecting a prepared resource to transfer to a client account. In one embodiment, a client requests a virtual machine having an operating system. The provisioning server 614 may determine that the request may be satisfied with a staged volume in a slot 604. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 614 may determine that a placement near other existing volumes is desirable for latency concerns. Therefore, the decision may find that sharing a router 608 is desirable but sharing a supply 606 and physical host 602 is undesirable. A volume in the pool may then be selected that matches these attributes and placed preferably on a same router 608 as the other volumes but not the same physical host 602 or power supply 606. In other examples of placement decisions, such as those relating to a database shard, sharing of infrastructure may be less desirable and a volume may be selected that has less infrastructure in common with other related volumes.

Figure 7:
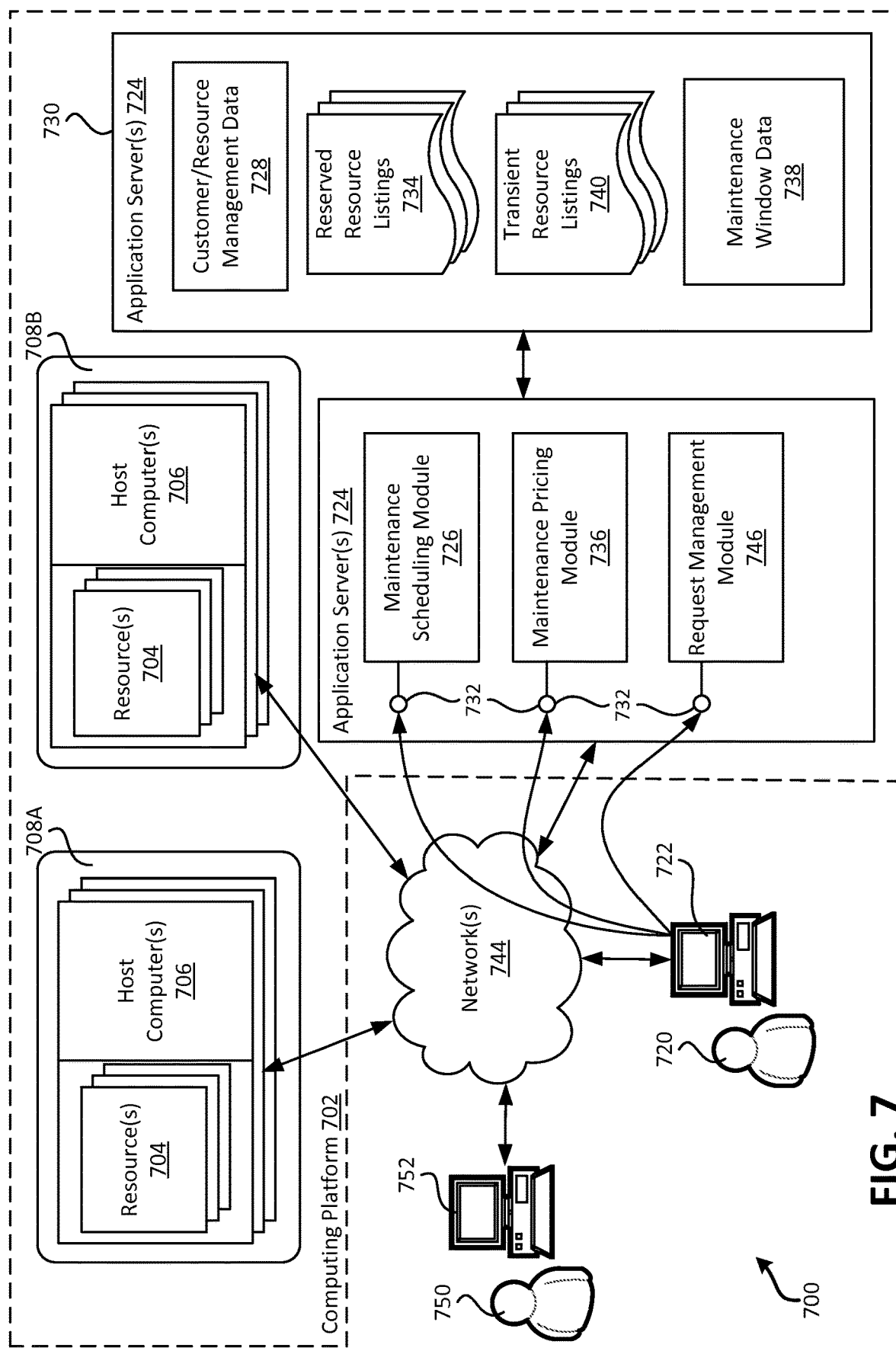
FIG. 7 is a flowchart depicting an example procedure for providing notifications in accordance with the present disclosure.

FIG. 7 is a system diagram that shows an illustrative operating environment 700 including several components for implementing the maintenance service 180. The environment 700 may include a computing platform 702. The computing platform 702 may be implemented by a computing resource provider to make computing resources available to customers 720 for the deployment and execution of distributed applications.

The computing resources provided by the computing platform 702 may include various classes of resources, such as data processing resources, data storage resources, data communication resources, and the like. Each class of computing resource may be general purpose or may be available in a number of specific configurations. For example, data processing resources provided by the computing resource provider may be made available in discrete units or resources 704. Each resource 704 may represent the data processing resources of a dedicated host computer 706, referred to herein as a dedicated tenancy resource, or each resource 704 may represent a virtual machine resource executing on a host computer 706, which may also be referred to as a shared tenancy resource.

The host computers 706 may represent generic multi-processor server devices, special purpose hardware devices, and the like. As discussed above, various types and configurations of resources 704 may be made available. For example, each available resource 704 of data processing resources may be of a particular size—such as small, medium, and large—representing different combinations of physical and/or virtual resources comprising or allocated to the resource—such as number and types of processors, amounts of memory, size and speed of local storage, number of networking addresses or communication channels, and/or the like. A resource 704 may further be configured with a particular platform, such as a specific OS and/or hypervisor installed on the resource. Resources 704 may also be made available with specific application software components installed, such as web server software, database management software, portal software, a specific runtime environment or platform, and the like.

Resources may further be available in specific availability zones 708A and 708B, as described above. As discussed above, an availability zone 708 may represent a particular physical location, such as a data center or other physical and/or logical grouping of underlying host computers 706 and computing devices supporting the resources 704 provided by the computing platform 702. Providing resources 704 in different sizes and in different availability zones 708 may allow a deployed application to be geographically dispersed, improving end-user performance and insulating the overall application from failures in one particular location or zone. For example, a customer 720 may choose to deploy a number of small resources 704 across multiple availability zones 708 for some functions of the application, such as web servers, while deploying a single large resource 704 for other functions, such as a database server, for example. The customer 720 may also require that resources 704 be hosted by host computers 706 in particular geographical locations for geopolitical reasons as well.

End-users 750 may utilize end-user computer systems 752 to access the functionality of the application executing on the allocated resources 704 through one or more network(s) 744. The network(s) 744 may represent a combination of local-area networks (LANs), wide-area networks (WANs), the Internet, and/or any other networking infrastructure known in the art that connects the host computers 706 in the computing platform 702 to the end-user computer systems 752, to each other and to other computing resources. The end-user computer systems 752 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 744 and communicating with the host computers 706 in the computing platform 702.

A customer 720 wishing to access resources on the computing platform 702 may similarly utilize a customer computer system 722 to connect the computing platform over the network(s) 744, and to configure and manage the computing resources provided by the computing platform. In this regard, the computing platform 702 may include a number of application servers 724 that provide various management services to the customer 720 for purchasing and maintaining resources 704 of data processing and/or other computing resources, deploying components of the application across the purchased resources 704, monitoring and administering execution of the application, and the like. As in the case of the end-user computer systems 752, the customer computer systems 722 may represent PCs, desktop workstations, laptops, notebooks, PDAs, electronic-book readers, game consoles, set-top boxes, consumer electronics devices, server computers, or any other computing device capable of connecting to the network(s) 744, and communicating with the application servers 724 in the computing platform 702.

The application servers 724 may represent standard server computers, database servers, web servers, network appliances, desktop computers, other computing devices, and any combination thereof. The application servers 724 may execute a number of modules in order to provide the management services. The modules may execute on a single application server 724 or in parallel across multiple application servers in the computing platform 702. In addition, each module may consist of a number of subcomponents executing on different application servers 724 or other computing devices in the computing platform 702. The modules may be implemented as software, hardware, or any combination of the two.

The application servers 724 may execute a maintenance scheduling module 726. The maintenance scheduling module 726 may schedule maintenance for resources 704 of data processing or other computing resources. Resources 704 may include resources that may be obtained through various modes, such as reserved resources, time-limited resources, and on-demand resources as described above. Purchased resources 704 for each customer 720 and corresponding configuration and status information may be stored in best practices data 728. The best practices data 728 may be stored in a database 730 or other data storage system available to the application server(s) 724 in the computing platform 702.

As described above, reserved resources provide the customer with the ability to reserve a number of a specific type and configuration of resources for a term, such as one year or three years. The reserved resources may represent actual resources of data processing resources configured as specified and placed in stand-by for launch and deployment by the customer 720 at a future time, or the reserved resources 704 may represent overall capacity reserved by the computing resource provider for quick configuration and launch when required. When deploying an application, a customer 720 may purchase and launch a number of on-demand resources 704 of a specific type and configuration (e.g., size, platform, tenancy, availability zone, and the like) to support immediate availability of the application, as well as a number of reserved resources of the same or similar type, and configuration for scaling up the application in the future in response to increased demand or capacity requirements of the application, for example.

A customer 720 may utilize a web browser application executing on the customer computer system 722 to access a user interface presented by the maintenance scheduling module 726 through a web service. The customer 720 may also utilize a web browser application executing on the customer computer system 722 to access a user interface presented by the request management module 746, or maintenance pricing module 736, through a web service to manage maintenance as discussed above. Additionally or alternatively, the resource management module 726, resource advisor module 736, and/or request management module 746 may expose an application programming interface (API) 732, which may be accessed over the network(s) 744 by stand-alone application programs executing on the customer computer system 722. Other mechanisms for accessing the configuration and maintenance services of the resource management module 726, resource advisor module 736, or resource status manager module 746 may also be imagined, including remote procedure calls, SOAP-based web services, remote file access, proprietary client-server architectures, and the like.

The maintenance pricing module 736 and request management module 746 may access the resource listings 734, storage listings 740, and maintenance window data 738 in the database 730.

The application servers 724 may execute maintenance pricing module 736 and template manager module 746. The customer 720 may utilize a web browser application executing on the customer computer system 722, to access a user interfaces (UI) presented by the maintenance pricing module 736, and template manager module 746 through a web service. Additionally or alternatively, the maintenance pricing module 736 and resource status manager module 746 may expose an API 732, which may be accessed over the network(s) 744 by stand-alone application programs executing on the customer computer system 722.

The maintenance pricing module 736 and request management module 746 may further store data records regarding submitted and fulfilled requests in the database 730 or other data storage system. The metrics data 738 may also be utilized by customer 720 or the computing resource provider to record billing data regarding maintenance windows.

In some embodiments, an API or a programming interface sub-system may be provided for facilitating the scheduling and billing pertaining to maintenance windows. The API may be configured to receive electronic messages that encode identifiers indicative of a request for scheduled maintenance by the provider network. In response to receiving one of the electronic messages, the API may send second electronic messages indicative of information indicating that the request has been received. An API may also be provided that can facilitate exchange of data with applications that may provide additional information for submitting requests.

In additional embodiments, the maintenance pricing module 736, or request management module 746, or other modules in the computing platform 702 may provide user interfaces or APIs 732 to the customer 720, and/or customer computer system 722 that allow the customer 720 to submit or review other information.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems, and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included, or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for managing computing resources by a provider network, the method comprising:
   instantiating by the provider network a virtual machine instance on a computing device;
   receiving by the provider network maintenance window data associated with the virtual machine instance, the maintenance window data indicative of a selection of a first option of continuing use of the virtual machine instance during a maintenance window or a second option of interrupting use of the computing resource during the maintenance window associated with an incentive;
   determining by the provider network, based on the data indicative of the selection, whether to allow continued use of the virtual machine instance or to interrupt use of the virtual machine instance;
   scheduling by the provider network performance of the maintenance on the computing device during the maintenance window based on determining to allow continued use of the virtual machine instance; and
   interrupting use of the virtual machine instance by the provider network during the maintenance window based on determining to interrupt use,
   wherein the maintenance window data indicative of the selection comprises a default response of continuing use of the virtual machine instance during a maintenance window at an incremental cost until a predetermined budget has been reached.

2. The method of claim 1, wherein the incentive is further based on a weight associated with the maintenance window.

3. The method of claim 1, wherein the incentive is further based on previous customer participation in previous maintenance windows.

4. The method of claim 1, wherein the incentive is further based on a relative density of resources on the computing device.

5. The method of claim 1, wherein the computing resource is allowed continued use or interrupted according to a predetermined default response.

6. The method of claim 5, wherein the predetermined default response is associated with the incentive.

7. The method of claim 5, wherein the predetermined default response comprises data indicative of conditionally accepting first option and a premium the incremental cost if the premium incremental cost is within a predetermined threshold.

8. The method of claim 1, further comprising updating account data by applying a premium or the incentive to a base price associated with an account.

9. The method of claim 8, wherein the incentive comprises a credit to the base price for the computing resource.

10. The method of claim 1, wherein the incentive comprises a modified time-based price.

11. The method of claim 9, wherein the credit comprises one or more of a price adjustment based on a time duration of the maintenance window or credit for interrupting use of the computing resource for the time duration of the maintenance window.

12. A system for managing computing resources by a provider network, the system comprising:
one or more computing devices;
at least one memory in communication with the one or more computing devices, the at least one memory having stored therein computer instructions that, upon execution by at least one of the one or more computing devices, at least cause the system to:
instantiate a computing resource on a first computing device other than the at least one of the one or more computing devices;
receive maintenance window data associated with the computing resource, the maintenance window data indicative of a selection of a first option of continuing use of the computing resource during a maintenance window or a second option of interrupting use of the computing resource during the maintenance window associated with an incentive;
determine, based on the data indicative of the selection, whether to allow continued use of the computing resource or to interrupt use of the computing resource; and
schedule the performance of maintenance on the first computing device during the maintenance window and in accordance with the determination of whether to allow continued use of the computing resource or to interrupt use of the computing resource,
wherein the maintenance window data indicative of the selection comprises a default response of continuing use of the computing resource during a maintenance window at an incremental cost until a predetermined budget has been reached.

13. The system according to claim 12, wherein the incentive comprises an incremental price decrease or a credit for discontinued use of the computing resource during the maintenance window.

14. The system according to claim 12, wherein the incentive is applied to a base price associated with the computing resource.

15. The system according to claim 12, wherein the incentive is adjusted to incorporate charges or credits in addition to a base price for the computing resource.

16. A non-transitory computer-readable storage medium having stored thereon computer-readable instructions, the computer-readable instructions comprising instructions that upon execution by at least one computing device of one or more computing devices, at least cause the at least one of the one or more computing devices to:
instantiate a computing resource on a first computing device other than the at least one computing device;
receive maintenance window data associated with the computing resource, the maintenance window data indicative of a selection of a first option of continuing use of the computing resource during a maintenance window or a second option of interrupting use of the computing resource during the maintenance window associated with an incentive;
determine, based on the data indicative of the selection, whether to allow continued use of the computing resource or to interrupt use of the computing resource; and
scheduling the performance of maintenance on the first computing device during the maintenance window and in accordance with the determination of whether to allow continued use of the computing resource or to interrupt use of the computing resource,
wherein the maintenance window data indicative of the selection comprises a default response of continuing use of the virtual machine instance during a maintenance window at an incremental cost until a predetermined budget has been reached.

17. The non-transitory computer-readable medium of claim 16, further comprising computer readable instructions that, upon execution by at least one computing device of one or more computing devices, at least cause the at least one computing device of one or more computing devices to:
receive, from a programming interface, the information indicative of the selection.

18. The non-transitory computer-readable medium of claim 16, wherein the interrupting use comprises shutting down the computing resource.

19. The non-transitory computer-readable medium of claim 16, wherein the interrupting use comprises migrating the computing resource to another computing device.

* * * * *